United States Patent
Lindgren et al.

(10) Patent No.: US 11,977,603 B1
(45) Date of Patent: May 7, 2024

(54) ITERATIVELY TRAINED MACHINE LEARNING MODELS FOR EVALUATIONS OF INTERNAL CONSISTENCY

(71) Applicant: Wells Fargo Bank, N.A., San Francisco, CA (US)

(72) Inventors: Carleton J. Lindgren, San Francisco, CA (US); Manesh Saini, New York City, NY (US); Hasan Adem Yilmaz, San Diego, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 782 days.

(21) Appl. No.: 17/072,922

(22) Filed: Oct. 16, 2020

Related U.S. Application Data

(60) Provisional application No. 62/986,380, filed on Mar. 6, 2020.

(51) Int. Cl.
| | |
|---|---|
| *G06F 18/214* | (2023.01) |
| *G06F 3/0482* | (2013.01) |
| *G06F 11/36* | (2006.01) |
| *G06F 18/24* | (2023.01) |
| *G06N 20/00* | (2019.01) |

(52) U.S. Cl.
CPC ........ *G06F 18/2148* (2023.01); *G06F 3/0482* (2013.01); *G06F 11/3692* (2013.01); *G06F 18/24* (2023.01); *G06N 20/00* (2019.01)

(58) Field of Classification Search
CPC .... G06F 18/2148; G06F 18/24; G06F 3/0482; G06F 11/3692; G06N 20/00
See application file for complete search history.

(56) References Cited

U.S. PATENT DOCUMENTS

| | | | |
|---|---|---|---|
| 7,756,800 | B2 | 7/2010 | Chidlovskii |
| 7,941,382 | B2 | 5/2011 | Stokes et al. |
| 8,311,960 | B1 | 11/2012 | Ginzburg et al. |
| 8,589,317 | B2 | 11/2013 | Paquet et al. |
| 9,342,795 | B1 * | 5/2016 | Poole ............... G06N 20/00 |
| 9,477,906 | B2 | 10/2016 | Roder et al. |
| 9,483,741 | B2 | 11/2016 | Sun et al. |
| 9,600,779 | B2 | 3/2017 | Hoover et al. |
| 9,678,957 | B2 | 6/2017 | Cormack et al. |
| 10,339,470 | B1 | 7/2019 | Dutta et al. |

(Continued)

*Primary Examiner* — Beau D Spratt
(74) *Attorney, Agent, or Firm* — Foley & Lardner LLP

(57) ABSTRACT

Disclosed is an approach for evaluating internal consistency of object classifications using machine learning modeling. In an example, models are iteratively trained, using supervised learning, on different majority segments (e.g., about 90%) of a dataset as training data segments. Trained models can be applied to the remaining data (e.g., about 10%) as test data segments to obtain, for each object, a predicted classification and a confidence score. Models in training iterations (e.g., 10 iterations) may be independently trained on substantially non-overlapping test data segments (with each iteration testing, e.g., about 10% of the dataset). When a model's predicted classification disagrees from a prior classification, and the confidence of the prediction is sufficiently high (indicating sufficiently strong disagreement), the object's prior classification may be revised. Training data, other than the data itself being evaluated for consistency, is not necessarily required.

19 Claims, 8 Drawing Sheets

(56) References Cited

U.S. PATENT DOCUMENTS

| | | | |
|---|---|---|---|
| 10,372,815 | B2 | 8/2019 | Simard et al. |
| 10,423,820 | B2 | 9/2019 | Santamaria-Pang et al. |
| 11,010,640 | B1* | 5/2021 | Daniels ................ G06V 10/454 |
| 11,049,015 | B1* | 6/2021 | Thomas .............. G06F 18/2415 |
| 2012/0011113 | A1* | 1/2012 | Cohen .................. G06F 16/951 |
| | | | 707/723 |
| 2014/0279716 | A1 | 9/2014 | Cormack et al. |
| 2018/0114142 | A1 | 4/2018 | Mueller |
| 2018/0260735 | A1* | 9/2018 | Arad ...................... G06N 20/00 |
| 2018/0330258 | A1 | 11/2018 | Harris et al. |
| 2018/0349796 | A1 | 12/2018 | Gibbs et al. |
| 2019/0114370 | A1 | 4/2019 | Cerino et al. |
| 2019/0164086 | A1 | 5/2019 | Amit et al. |
| 2019/0294797 | A1 | 9/2019 | Harms et al. |
| 2020/0380212 | A1* | 12/2020 | Butler .................. G06F 16/211 |
| 2022/0070196 | A1* | 3/2022 | Sarkar ................. H04L 63/1416 |
| 2022/0366490 | A1* | 11/2022 | Duttagupta ........... G06F 16/353 |

\* cited by examiner

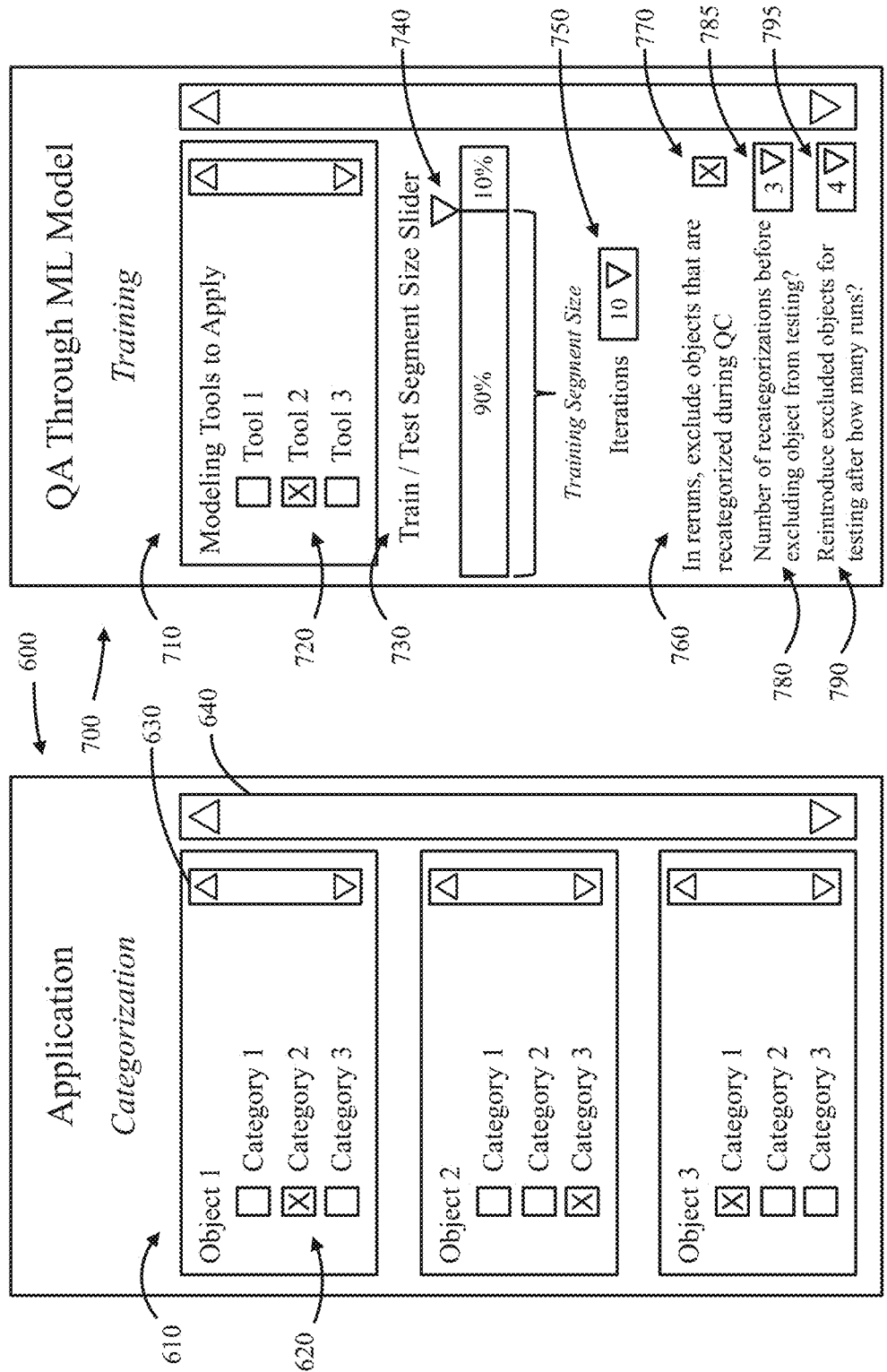

ITERATIVELY TRAINED MACHINE LEARNING MODELS FOR EVALUATIONS OF INTERNAL CONSISTENCY

CROSS-REFERENCE TO RELATED APPLICATIONS

This application claims the benefit of and priority to U.S. Provisional Patent Application No. 62/986,380, filed Mar. 6, 2020, and entitled "Iteratively Trained Machine Learning Models For Evaluations Of Internal Consistency," the entirety of which is hereby incorporated by reference.

TECHNICAL FIELD

The present disclosure relates to application of machine learning to evaluating internal consistency of classifications for objects by using classification data to iteratively train machine learning models that are then used to determine whether certain objects warrant reclassification.

BACKGROUND

Categorizing a large number of items can be time-consuming, tedious, and internally inconsistent. Frequently, assigning categories to items involves judgment calls which may be error prone or subject to shifts in perspective. For example, if 10,000 tasks are to be categorized according to 15 task types, an incorrect or not preferred category may be assigned to a task as a result of, for example, a misunderstanding or misinterpretation of the task or the available categories. Often, there may be inconsistencies in how items are categorized if, for example, different persons are categorizing the tasks and each interprets items or categories slightly differently, if the same person views items slightly differently on different days, and/or if a person's interpretation of tasks and categories evolves during the process. A person's categorization of his or her one thousandth item may be more informed, performed with a different degree of care, and/or approached differently from the person's approach in categorizing his or her tenth or hundredth item, such that the same item might be categorized one way if encountered at one point in time, but differently if encountered by the same person at another point in time. Moreover, reviewing the quality of categorizations also tends to be time consuming and inconsistent. For example, different persons checking and rechecking prior categorizations at different times and with different perspectives may catch some obvious errors or otherwise refine categories for certain items, but may do so inconsistently, as the review may also be performed by multiple people with varying and/or evolving perspectives and approaches over potentially many days, weeks, or months. Sometimes, an original categorization of an item may be preferable over a recategorization during quality review by the same person (but, e.g., on a different day) or by another person (who may, e.g., have a different perspective or approach).

SUMMARY

Various embodiments of the disclosure relate to a machine learning method implemented using one or more computing devices of a machine learning platform. The method may include generating, for objects in a dataset comprising a set of prelabeled objects, machine-predicted labels by (i) training, via supervised learning, a machine learning model on a majority of the dataset and (ii) applying the trained machine learning model to the remainder of the dataset to obtain machine-predicted labels and corresponding confidence scores, wherein (i) and (ii) are repeated until every object in the set of objects has a prelabel, a machine-predicted label, and a confidence score corresponding to the machine-predicted label; for each machine-predicted label with a corresponding confidence score that is greater than a threshold, comparing the machine-predicted label with the corresponding prelabel to generate a subset of objects that have machine-predicted labels in disagreement from corresponding prelabels; presenting a graphical user interface comprising the subset of objects and, for each object in the subset, a user field configured to trigger, in response to a detected input therein, relabeling of the object; detecting, via the graphical user interface, one or more relabels for one or more objects in the subset; and transmitting to a user device a report comprising the set of objects in the dataset and, for each object, at least one of the prelabel or the relabel.

Various other embodiments of the disclosure also relate to a machine learning method implemented using one or more computing devices of a machine learning platform. The method may include generating, for objects in a dataset comprising a set of prelabeled objects, machine-predicted labels by (i) training, via supervised learning, a machine learning model on a majority segment of the dataset and (ii) applying the trained machine learning model to a minority segment of the dataset to obtain machine-predicted labels, wherein (i) and (ii) are repeated iteratively until every object in the set of objects has a prelabel and a machine-predicted label, and wherein in each iteration, the majority segment comprises from about 80% of the dataset to about 95% of the segment, and the minority segment comprises the remaining about 5% to about 20% of the dataset; and modifying prelabels in the dataset in response to finding differences between the prelabels and corresponding machine-predicted labels for a subset of objects in the dataset.

Various embodiments of the disclosure relate to a machine learning platform. The machine learning platform may include a computing device having a processor and a memory with instructions executable by the processor to cause the computing device to: generate, for objects in a dataset comprising a set of prelabeled objects, machine-predicted labels by (i) training, via supervised learning, a machine learning model on a majority of the dataset and (ii) applying the trained machine learning model to the remainder of the dataset to obtain machine-predicted labels and corresponding confidence scores, wherein (i) and (ii) are repeated until every object in the set of objects has a prelabel, a machine-predicted label, and a confidence score corresponding to the machine-predicted label; for each machine-predicted label with a corresponding confidence score that is greater than a threshold, compare the machine-predicted label with the corresponding prelabel to generate a subset of objects that have machine-predicted labels in disagreement from corresponding prelabels; present a graphical user interface comprising the subset of objects and, for each object in the subset, a user field configured to trigger, in response to a detected input therein, relabeling of the object; detect, via the graphical user interface, one or more relabels for one or more objects in the subset; and transmit to a user device a report comprising the set of objects in the dataset and, for each object, at least one of the prelabel or the relabel.

These and other features, together with the organization and manner of operation thereof, will become apparent from the following detailed description and the accompanying drawings.

BRIEF DESCRIPTION OF THE DRAWINGS

FIG. 6 is an example user interface for detecting classification selections for objects in a set, according to various potential embodiments.

FIG. 7 is an example user interface for selecting parameters for training of machine learning models, according to various potential embodiments.

DETAILED DESCRIPTION

Through various manual or other efforts, a set of items ("objects") might initially be categorized or otherwise classified based at least in part on, for example, human judgment. The number of objects may be quite large, potentially numbering in the tens or hundreds of thousands or larger, and each object may be individually classified into one of available categories (e.g., 10, 20, or 30 categories). The initial classification may be tedious, time-consuming, and internally inconsistent. To check the accuracy of classifications, a quality assurance (QA) effort may involve manually rechecking each classification, which can also be a very tedious, time-consuming, and flawed process. It is often thus desirable to automate the process in a manner that saves time and reduces human error. However, there may be no other available data to use, as this might be the first time such objects are classified into such categories. For example, the object set may be unique (e.g., the specific processes of a specific organization), as may be the potential classifications (e.g., particular categories conceived for the specific circumstances of the specific organization). Consequently, there is often no comparable or exemplary dataset with object classifications known to be accurate or otherwise reliable for comparison with the manual classifications as part of an automated review process.

Figure 5:
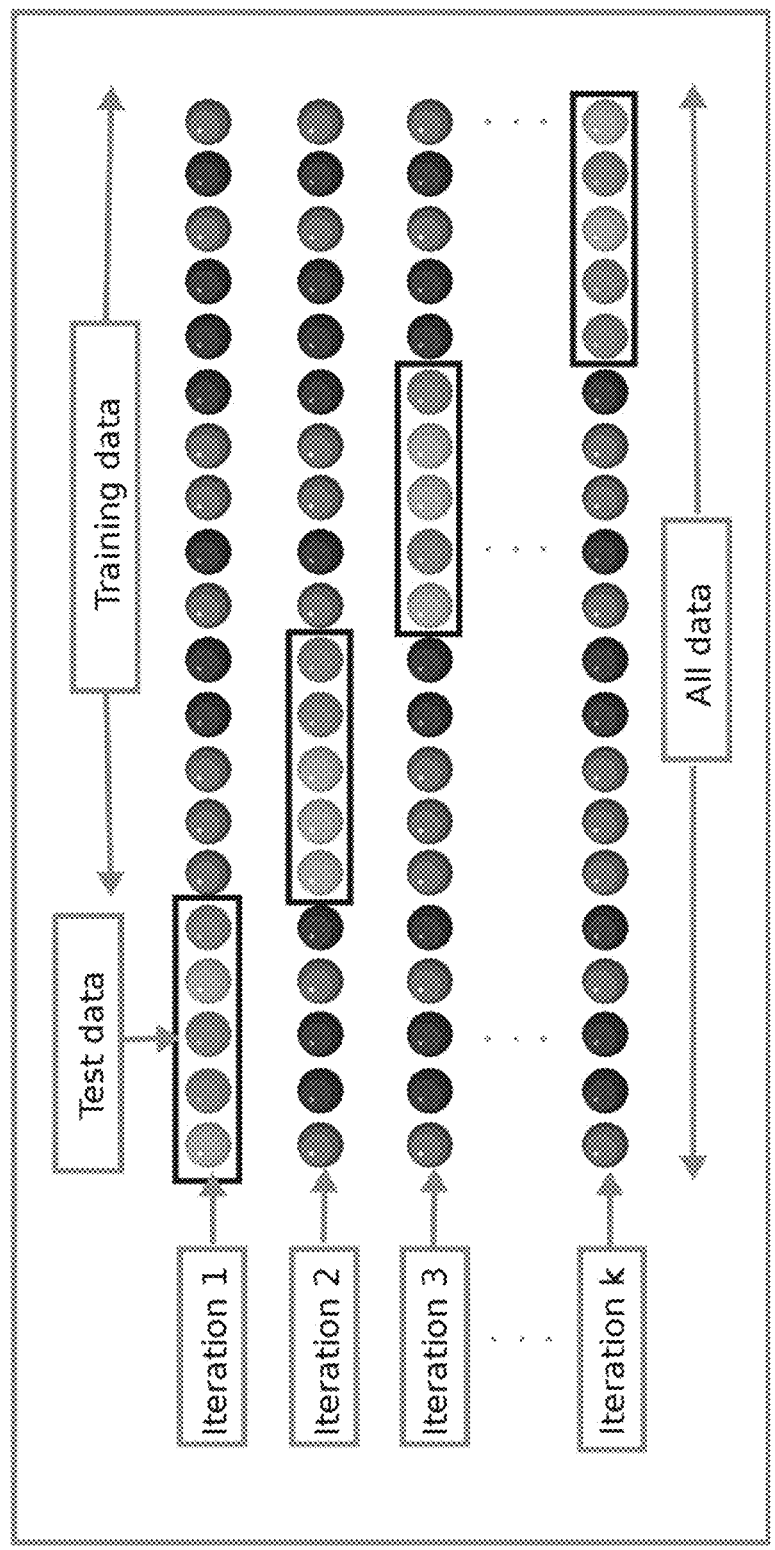
FIG. 5 is a representation of an example process for training machine learning models in k number of iterations using, in each iteration, a majority of data in a dataset as training data and the remainder of the data in the dataset as test data, according to various potential embodiments.

In various embodiments, the disclosed approach involves using the manual classifications themselves (i.e., the data being evaluated) as training data for machine learning models, without the need for other training data. Referring to FIG. 5, a dataset with object-category pairs (i.e., with a set of objects, each object associated with a manual or otherwise preexisting classification) can be segmented into non-overlapping "minority" (substantially smaller) segments, such as 10 segments each comprising 10% of the data. In each segmentation, the "majority" (substantially larger) portion, such as 10 segments each comprising 90% of the data, may be used as training data that is assumed to be correct for the iteration. In each majority-minority pair of segments, a machine learning model may be trained on the majority (training) segments, and the trained machine learning model may be applied to the minority (test) segments to obtain, for each object, a predicted category. The iterations in the training process may be independent, such that separate models are trained rather than training the same model in subsequent iterations (i.e., rather than having one model that is trained on more and more data through the iterations).

The predicted categories can be used in determining whether the manual (or prior) categorization for each object is to be kept or changed. In various embodiments, the machine learning models yield confidence scores for each prediction, such as a score ranging from zero (0) to one (1), with zero indicating no confidence in a corresponding prediction, and one indicating 100% confidence in a corresponding prediction. When there is a sufficiently strong disagreement between the prior classification and the predicted classification for an object (e.g., when the predicted classification differs from the prior classification and the confidence score exceeds a threshold like 0.9 or 0.95), the object can be flagged for re-review and relabeling. The "cleaner" data (with classifications for a subset of corrected or otherwise revised objects modified based on the results of the testing) can be further evaluated in additional "runs" involving subsequent iterative trainings of machine learning models on revised data with the goal of further enhancing internal consistency. In some embodiments, if a confidence score is sufficiently high (e.g., 0.95 or 0.99), an object's prior classification can automatically be changed to the predicted classification. This automated change can be performed in each run, or only in subsequent runs if the same prediction is obtained in multiple runs, or if the same prediction is obtained using different subsets of objects (i.e., different majority segments) as training data. In certain embodiments, further manual review may be obtained for situations in which an object's category has been automatically changed in one or more prior runs and yet is predicted to be a category that differs from a prior category (with sufficiently high confidence) in a subsequent run.

This approach capitalizes on a recognition that, quite often, errors (e.g., in human judgement) are idiosyncratic rather than systemic, and that prior categorizations (even though they require quality review) can be used to train a machine learning model to automate quality-checks of past categorization efforts without undergoing subsequent review of the same data, a review that would be tedious, time-consuming, and prone to significant internal inconsistencies that could go unchecked if the subsequent review is given too much credence. This approach enhances computational efficiency at least because substantial prior data and/or training efforts are not required to reevaluate classifications. This approach is unconventional at least because, conventionally, the data being tested is not also the only data that is used to train machine learning models for use in testing the same data, as is the case in various embodiments of the disclosure.

Figure 1:
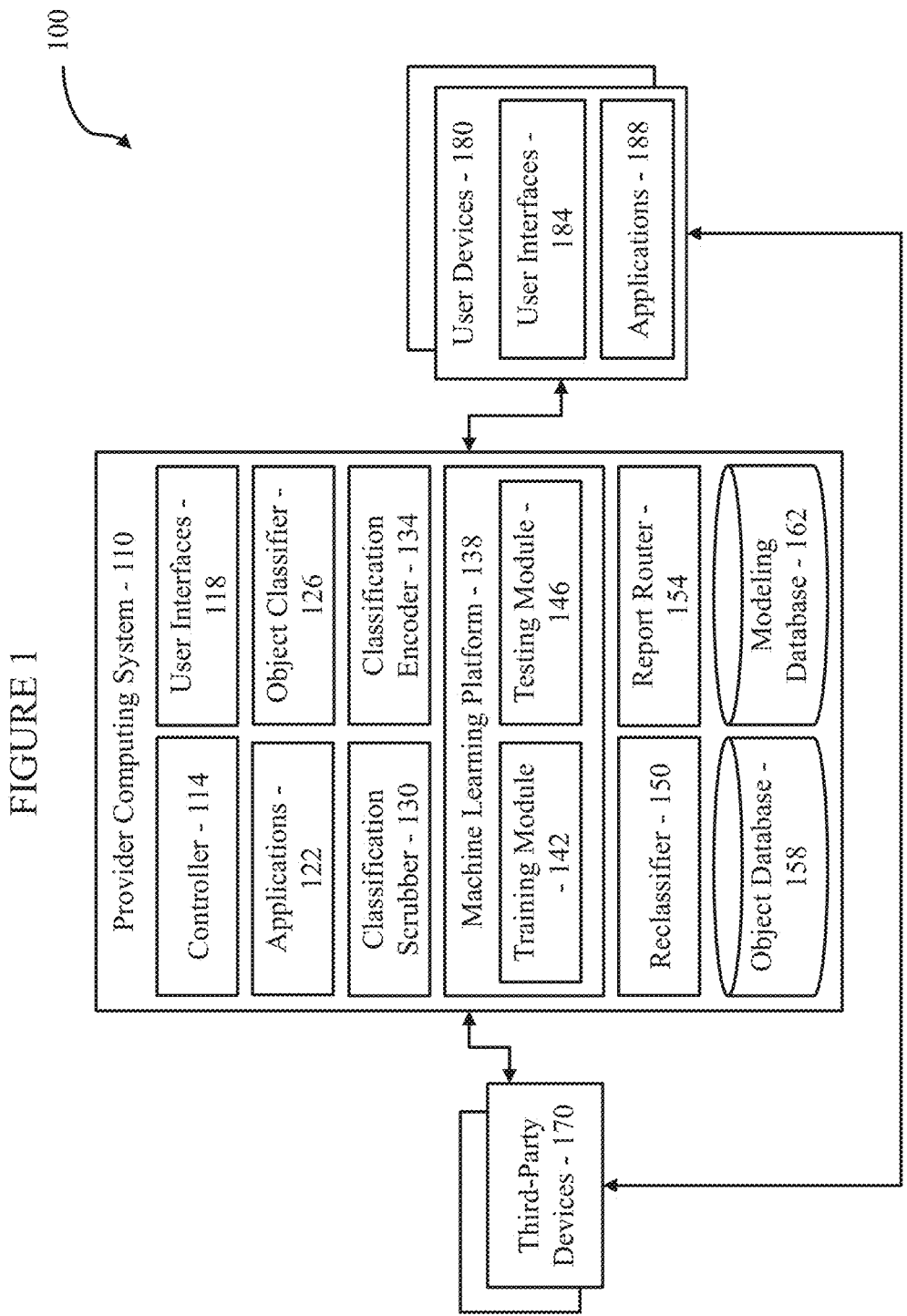
FIG. 1 is a block diagram of a provider computing system that implements a machine learning platform to evaluate internal consistency of object classifications, according to various potential embodiments.

Referring to FIG. 1, a block diagram of a system 100 is shown. The example system 100 includes a provider computing system 110 (of, e.g., any entity with object classifications to review), which may be implemented using one or more computing devices. The system 100 may also include third-party devices 170 (of, e.g., various information sources or sources of various techniques and tools available via various websites, databases, etc.), and user devices 180 (of, e.g., classifiers and reviewers). The components of the system 100 may be communicably and operatively coupled to each other directly or over a network that permits the direct or indirect exchange of data, values, instructions, messages, and the like (represented by double-headed arrows in FIG. 1).

Each system and device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise by sending and receiving transmissions via one or more communications protocols. Wireless interfaces may enable, for example, near-field communication (NFC) between two devices located close to each other (e.g., within four centimeters of each other), and may include other protocols such as Bluetooth, Wi-Fi, and/or wireless broadband. The various components of devices in system 100 may be implemented via hardware (e.g., circuitry), software (e.g., executable code), or any combination thereof. Each system and device in system 100 may moreover include a security client which may provide fraud prevention measures and security protections (such as generation of security tokens, authentication of devices, verification of biometric or other security data, etc.).

The systems and devices in system 100 may also include application programming interface (API) gateways to allow the systems and devices to engage with each other via various APIs, such as APIs that facilitate authentication, data retrieval, etc. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), accounts, dates, functionalities, tasks, etc. In system 100, a system or device may provide various functionality to other systems and devices through APIs by accepting API calls via an API gateway. The API calls may be generated via an API engine of a system or device to, for example, make a request from another system or device.

The provider computing system 110 may include a controller 114 with a processor and memory with instructions executed by the processor to control operations and functionality of the provider computing system 110 and components thereof. User interfaces 118 may include input/output (I/O) components may allow a user to provide inputs (e.g., a touchscreen, stylus, force sensor for sensing pressure on a display screen, etc.) and provide perceptible outputs (e.g., displays and light sources for visually-perceptible elements, a speaker for audible elements, and haptics for perceptible signaling via touch). User interfaces 118 may include biometric sensors such as fingerprint readers, heart monitors that detect cardiovascular signals, iris scanners, face scanners, and so forth. User interfaces 118 may also include ambient sensors that detect surrounding conditions, such as ambient sights and sounds, and may include cameras, imagers, or other light detectors, and microphones or other sound detectors. User interfaces 118 may additionally include location and orientation sensors, such as a GPS device, gyroscope, digital compass, accelerometer, etc. Provider computing system 110 may also run one or more applications 122 that allow users to interact with system 110 and input selections for various functionalities.

An object classifier 126 acquires classifications for objects. The classifications may be acquired via, for example, user interfaces presented via provider computing system 110 and/or one or more user devices 180. Such user interfaces may be, for example, graphical user interfaces that present objects and accept classification selections as inputs. The classification scrubber 130 may accept classification data (e.g., text fields) and clean, normalize, or otherwise process the data in preparation for use in training of machine learning models, such as lemmatization and removal of stop words and white space. A classification encoder 134 may encode certain classification data for use in training models, such as by generating n-grams for classifications which may have been obtained from the classification scrubber 130 and hot-encoding the n-grams to generate zeroes and ones depending on whether an n-gram is present in corresponding text.

Provider computing system 110 may also include a machine learning platform 138 with a training module 142 for training various models using machine learning techniques. The trained models from training module 142 may be applied to the data via a testing module 146. A reclassifier 150 may, based on classification predictions acquired via the machine learning platform 138, determine whether or how to change classifications for certain objects. For example, reclassifer 150 may determine whether a confidence score for a prediction is sufficiently high to either automatically reclassify an object, and/or to seek manual review of the object's prior classification. Reclassifier 150 may also generate another dataset with the objects and, for each object, either the prior classification or a new classification (e.g., predicted classification with sufficiently-high confidence score or detection of replacement classification selections).

A report router 154 may generate reports of predictions, confidence scores, reclassifications, progress in reducing internal inconsistency (as gauged by, e.g., a number of disagreements and reclassifications through multiple runs), etc. The report router 154 may determine that a user device 180 (of, e.g., a "special" reviewer) is a suitable destination device for reporting on predictions or review efforts based on, for example, a determination that classifications of certain objects are unreliable based on repeated disagreements between predictions and prior reclassifications. One or more databases may comprise data on objects, object classifications, and modeling data. For example, the provider computing system 110 may comprise object database 158 with data on objects, classification labels, and replacement classification labels. The provider computing system 110 may also comprise a modeling database 162 with data on scrubbed classifications and classification features, predictions, confidence scores, and results of each run.

In various embodiments, provider computing system 110, or one or more of its components, may use any machine learning or artificial intelligence (AI) techniques deemed suitable for the particular dataset. For example, in various embodiments, classification scrubber 130 and/or classification encoder 134 may apply natural language processing to classification data. Similarly, machine learning platform 138 may use regression, gradient boosting, neural networks, and/or other tools deemed suitable.

User devices 180 include user interfaces 184 to allow users to interact with the devices. I/O components may allow a user to provide inputs and provide perceptible outputs, and may include biometric, ambient, location, and orientation sensors, as discussed herein. User devices 180 also run applications 188 that provide users with certain functionalities, tools, selections, etc. In some embodiments, one or more user devices 180 are a part of the provider computing system 110.

Figure 2:
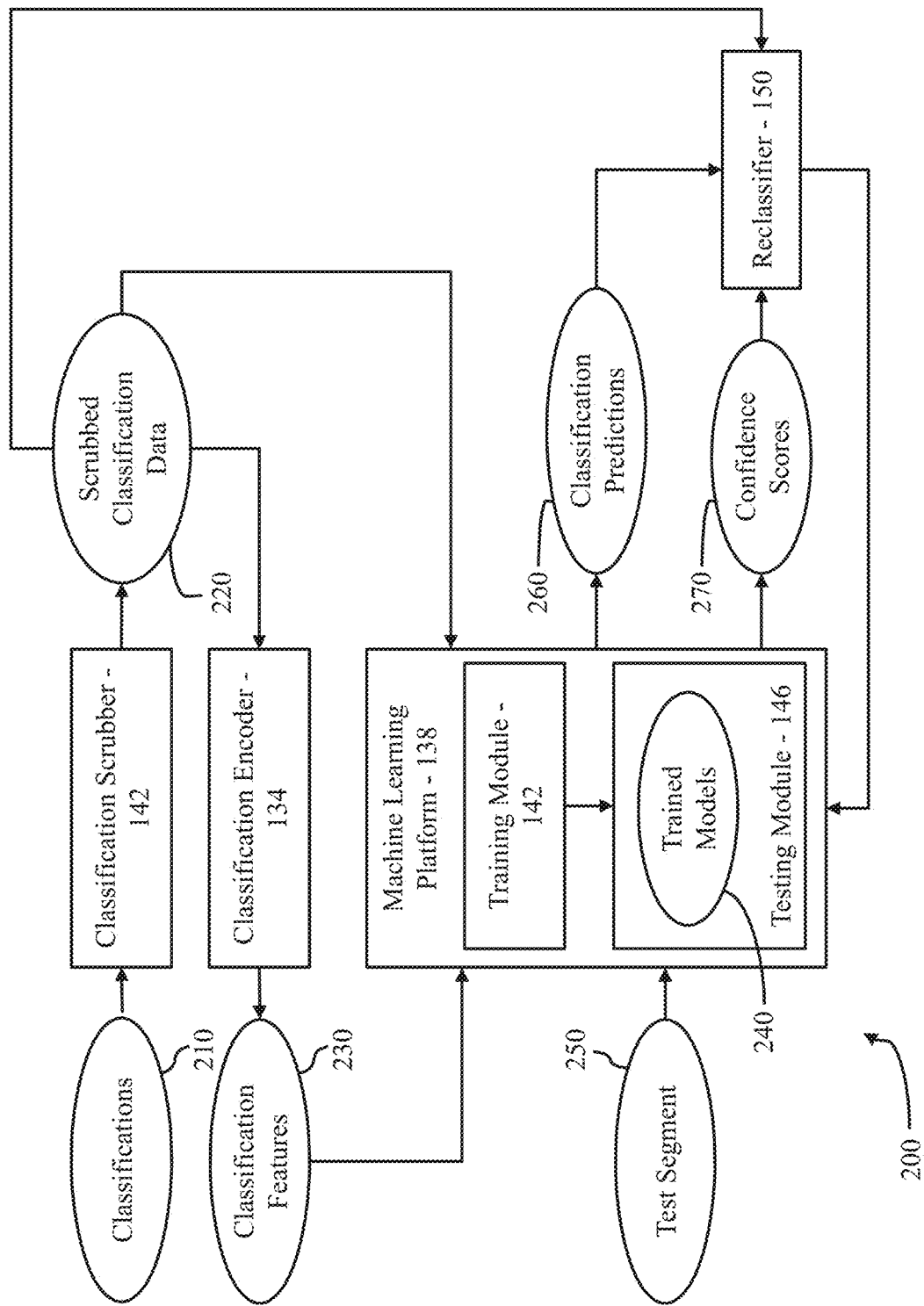
FIG. 2 is a block diagram of various components of the system of FIG. 1 and example inputs and outputs thereof, according to various potential embodiments.

Referring to FIG. 2, the classification scrubber 142, classification encoder 134, machine learning platform 138, and reclassifier 150 of FIG. 1 and inputs and outputs thereof are depicted, according to various potential embodiments. The classification scrubber 142 may receive as inputs "raw" classifications 210, such as the text of each selectable category for objects in a set. The raw classifications may comprise sentences, loosely organized notes, etc. Classification scrubber 142 may perform various processes on the text, such as lemmatizing the text and/or removing stop words and white space, to produce scrubbed classification data 220 to serve as a consistent body of text for each classification.

The scrubbed classification data 220 may be fed to the classification encoder 134 for additional processing, and/or to the machine learning platform 138 for model training. The classification encoder 134 may generate n-grams for the text fields. Example n-grams include single words, two word combos, and three word combos. In various embodiments, classification encoder 134 may use only n-grams that appear in the text a certain minimum number of times, such as five or more times, to enhance statistical significance. Lemmatization, removal of stop words, and/or generation of n-grams may at least in part be performed using, for example, open-source modules available in the Natural Language Toolkit (see, e.g., https://www.nltk.org/). A set of potential n-grams may include, in an example, "acceptance," "acceptance testing," "acceptance testing product," "accepted," "accepting," "accepting incoming," "accepting incoming money," "accepts," "access," "access account," "access account includes," "access control," "access database," and "access management." In some embodiments, thousands of n-grams may be generated for use in the machine learning models.

The classification encoder 134 may also one-hot encode the n-grams, such that for each n-gram, a variable or feature is created, where the variable or feature is a one (1) if the n-gram is found in the text, and a zero (0) if the text did not include the n-gram. The resulting set of ones and zeros (i.e., the values for the variable or feature) may form part of the classification features 230, which may be fed to the machine learning platform 138. Categorical variables may be label-encoded for use by the models. Label encoding may be performed at least in part using, for example, label encoders available through Scikit-Learn (see, e.g., https://scikit-learn.org/stable/).

The training module 142 of the machine learning platform 126 may receive a majority (or "majority segment") of the dataset as a "training partition," such as 80% or more of data being evaluated for internal consistency. In an example, the training partition of the dataset may comprise, for example, 90% of objects and, for each object, classification data 220 and classification features 230. The training module 142 may iteratively train machine learning models on majority segments to generate trained machine learning models 240. The models may apply such AI models as random forest, extremely random forest, and/or "XGBoost" (or other gradient boosting). The AI models may be, for example, called through Python (see, e.g., https://scikit-learn.org/). The testing module 146 may apply the trained models 240 to test segments 250 (e.g., dataset "minority segments" that exclude data in the dataset majority segments). The training module 142 may use supervised learning to train machine learning models 240 comprising inferred functions or other classifiers that accept objects as inputs and yield classifications as outputs. The majority segments may serve as labelled datasets with both objects (the input parameters) and the classifications (the output parameters).

For each object in the test segments, the testing module 146 may generate a classification prediction 260 and a machine learning confidence score 270 ranging from zero (0) to one (1). The predicted classification 260 for an object may be the same as the prior classification (e.g., the existing classification which may have been obtained through manual effort or a prior training and testing run). Alternatively, the predicted classification 260 may differ from the prior classification. The confidence score corresponds with the model's "confidence" in the prediction, and correlates with the likelihood that the predicted classification is the correct, appropriate, or otherwise consistent classification.

The classification predictions 260 and corresponding confidence scores 270 may be fed to the reclassifier 150, which acts on the predicted classifications. The reclassifier 150 may, for example, determine that a model's classification strongly disagrees from a prior classification (received as, e.g., scrubbed classification data 220) if the corresponding confidence score 270 is high, such as above 0.9 or 0.95. The reclassifier may, in various embodiments, replace the prior classification for an object with the predicted classification for the object if the confidence score 270 is sufficiently high. For example, a predicted classification that has a 0.99 confidence score for a prediction that differs from the prior classification (e.g., the model "strongly disagrees" with the prior classification) may automatically replace a prior classification. In some embodiments, the reclassifier 150 considers confidence scores 270 for an object from multiple "runs," such that, for example, a prior classification is not replaced with a predicted classification with a certain confidence score (0.95), but if the same prediction is produced by corresponding models in one or more subsequent runs (each with sufficiently high confidence scores, such as 0.9 or greater), an original classification may be replaced by the repeatedly-predicted classification.

In various embodiments, a disagreement with a certain minimum confidence score 270 may be transmitted to a user device 180 for presentation via a graphical user interface to allow a user to indicate whether the classification should be kept unchanged or should be changed. For example, a prediction that has a 0.90 confidence score for a prediction that differs from the prior classification may be presented to a user for potential revision. In some embodiments, a disagreement in one run may not trigger presentation for review via a graphical user interface, but disagreements in two or more runs may trigger such presentations. The reclassifier 150 may generate additional datasets, each of which may be partitioned into, for example, training segments and non-overlapping testing segments for use by machine learning platform 138 in subsequent runs.

It is noted that, in various embodiments, the functions performed by the systems, devices, and components depicted in FIGS. 1 and 2 may be performed by a greater number of components or fewer components, and may be performed by other combinations of devices and systems. For example, the functions performed by one component as depicted may instead be performed by two or more components, and/or the functions performed by two or more components as depicted may instead be performed by one component. Similarly, functions may be redistributed among components, devices, and systems. For example, the functions performed by one combination of components, devices, and/or systems as depicted may instead be performed by another combination of components, devices, and/or systems.

Figure 3:
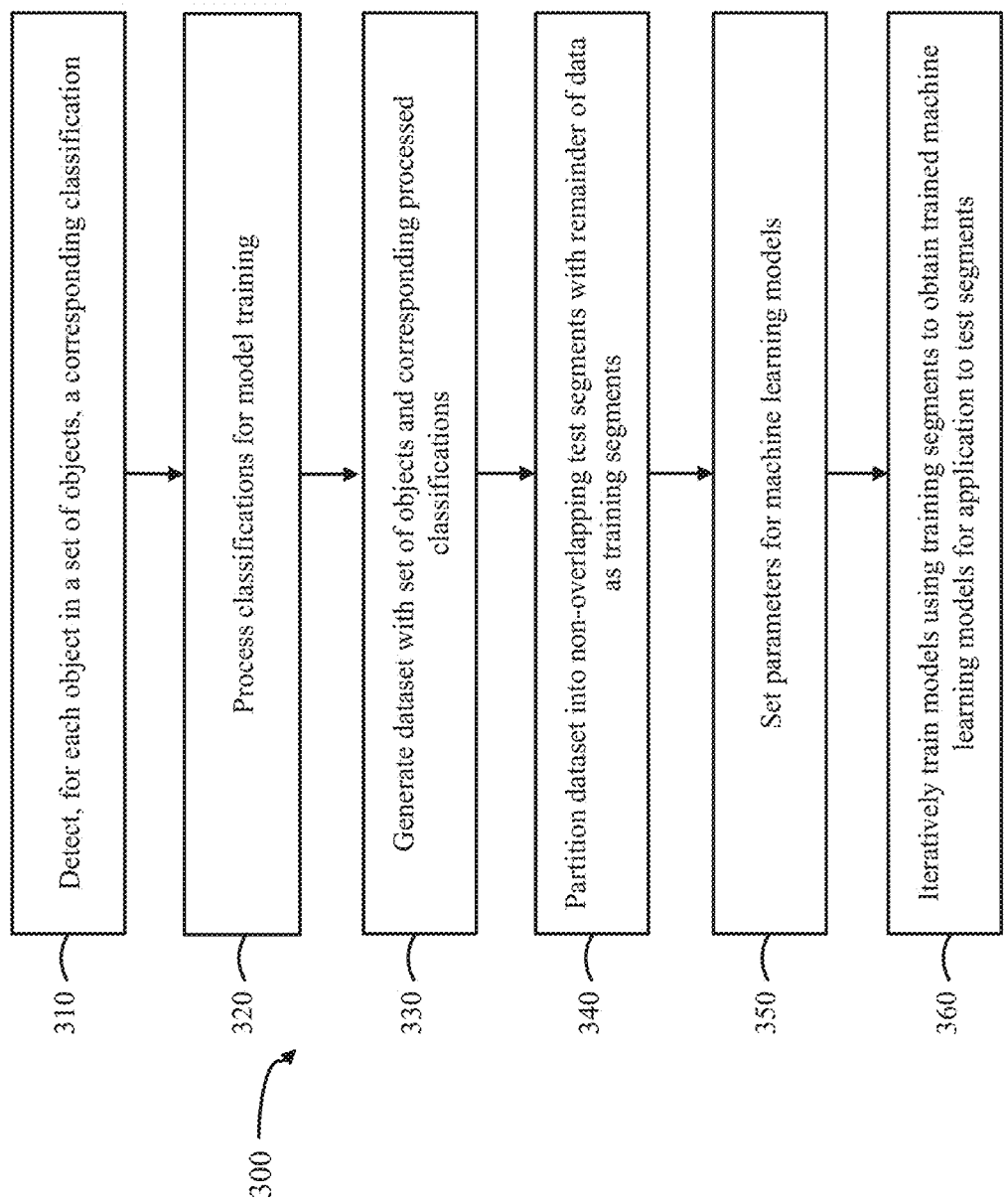
FIG. 3 is a flow diagram of an example process for preparing data for training of machine learning models, according to various potential embodiments.

FIG. 3 depicts an example process 300 involving provider computing system 110, according to various potential embodiments. At 310, provider computing system 110 (via, e.g., object classifier 126) may detect, for each object in a set of objects, a corresponding initial classification. This may be via, for example, presentation of objects via a graphical user interface on one or more user devices 180, and detection of category selections for the objects via the graphical user interface. The provider computing system 110 (via, e.g., classification scrubber 130 and classification encoder 134) may, at 320, process the classifications for model training and, at 330, generate a dataset with the objects and corresponding processed classifications. The provider computing system 110 (via, e.g., machine learning platform 138) may partition the dataset into training segments and test segments, such as 10 training segments each with about 90% of the dataset, and 10 non-overlapping test segments each with the remaining about 10% of the dataset. At 350, parameters for the machine learning models may be selected or otherwise determined. Example parameters may include which techniques or learning methods should be used to train the models. The parameters may also include how large (i.e., what percentage of the dataset) the majority and minority segments should be, such as 80% or 90% for majority training segments and 20% or 10%, respectively, for minority test segments. At 360, machine learning platform 138 may iteratively train machine learning models using majority training segments of the dataset.

Figure 4:
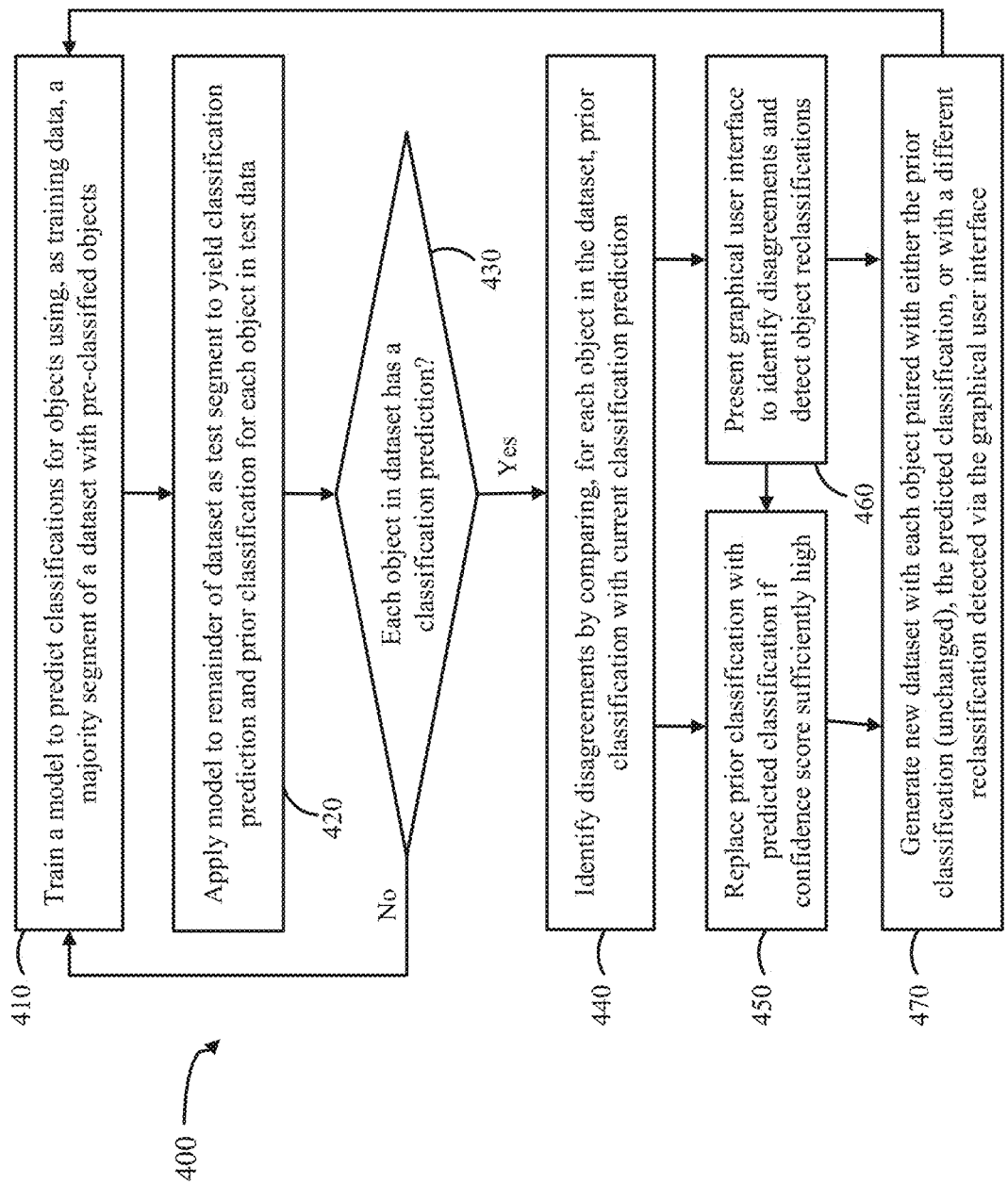
FIG. 4 is a flow diagram of an example process for using iteratively-trained machine learning models to test data, according to various potential embodiments.

FIG. 4 depicts an example process 400 involving provider computing system 110, according to various potential embodiments. At 410, in a first iteration, the machine learning platform 138 trains a first machine learning model to predict classifications for objects. The model may be trained using a first majority segment of a dataset that includes pre-classified objects (i.e., objects with existing classifications, such as objects manually classified, or objects classified according to a predicted or predetermined classification from a prior run). The first machine learning model may be trained according to selected training parameters. At 420, the trained machine learning model is applied to the objects in the remainder of the dataset (a first test segment) to obtain a classification prediction for each object. Each object in the first test segment will have, as a result, a prior classification and a predicted classification.

At 430, the machine learning platform 138 may determine whether every object in the dataset has a classification prediction (in addition to a prior classification). That is, the machine learning platform 138 determines whether a machine learning model has been applied to every object in the dataset (when each object was part of a test segment). If not, process 400 returns to step 410, at which point a second machine learning model is trained on a second majority segment, and at 420, the second machine learning model is applied to a second test segment to obtain classification predictions for the objects in the second test segment. The is iteratively repeated for non-overlapping test data as represented in FIG. 5.

If, at 430, it is determined that every object has a predicted classification, the provider computing system 110 (e.g., the reclassifier 150) may, at 440, identify disagreements between the predicted classifications and the prior classifications. Disagreements may be found, for example, by comparing, for each object in the dataset, prior and predicted classifications to identify which objects have differences in the two. Disagreement may be flagged or otherwise deemed significant if a corresponding confidence score for the prediction is sufficiently high, such as above 0.8 or 0.95. At 450, a prior classification may automatically be replaced with the predicted classification if the confidence score corresponding to the predicted classification is sufficiently high (e.g., at least 0.95 or 0.99). Alternatively, at 460, the prior and predicted classifications may be presented via a graphical user interface on a user device 180 so that a selection for a replacement classification may be detected. If, at 460, the predicted classification is detected as being the selected replacement classification, the process 400 continues to 450 to replace (based on user selection rather than automatic replacement) the prior classification with the predicted classification.

At 470, a new dataset may be generated. The new dataset may comprise the objects in the previous dataset, with each object paired with one of: (1) the prior classification (i.e., the prior classification is left unchanged, either because there is no disagreement or because of a selection, submitted via a graphical user interface, to leave the prior classification unchanged despite the disagreement; (2) the predicted classification (e.g., because the prior classification was automatically replaced at 450, or because of a selection, submitted via a graphical user interface at 460, to accept the predicted classification as replacement in light of a high-confidence prediction); or (3) a reclassification, which differs from the prior and predicted classifications, selected via a graphical user interface at 460, indicating that neither the prior nor the predicted classifications are deemed correct. Process 400 may then return to step 410 to train another model using a majority segment of the second dataset.

FIG. 6 provides an example graphical user interface 600 for categorizing objects, according to example embodiments. The graphical user interface 600 may be presented via, for example, an application 188 accessed via a user device 180 and/or an application 122 accessed via the provider computing system 110. Graphical user interface 600 may include an object-category selection region 610 for each object in a dataset. For each object in each object-category selection region 610, graphical user interface 600 may include a category selector 620. As shown, graphical user interface 600 allows for selection of different categories via selection of one or more categories or selection of the squares next to the corresponding categories. In FIG. 6, "Category 2" has been selected for Object 1, "Category 3" has been selected for Object 2, and "Category 1" has been selected for Object 3, as indicated by the "X" in the square adjacent to each category. Each object-category selection region 610 includes a scroll bar 630 to allow for access to categories that do not fit in the object-category selection region 610 as shown. Similarly, graphical user interface 600 includes a scroll bar 640 to allow for access to objects that do not fit in graphical user interface 600 as shown. In various embodiments, categories for objects may additionally or alternatively be selectable in other ways, such as via pull-down menus, text entry, or otherwise.

FIG. 7 provides an example graphical user interface 700 for ensuring internal consistency in object categorizations, according to various potential embodiments. The graphical user interface 700 may be presented via, for example, an application 188 accessed via a user device 180 and/or an application 122 accessed via the provider computing system 110. Graphical user interface 700 may include a technique selection region 710 with a modeling tool selector 720 to allow for selection of which AI or machine learning techniques to use in model trainings. In FIG. 7, "Tool 2" has been selected, as indicated by the "X" in the square adjacent to Tool 2. Examples of potential tools include random forest, extreme random forest, and "XGBoost" or other gradient boosting. Graphical user interface 700 also includes a segment size selector region 730 to allow for selection of sizes (percentages or proportions) for majority (training) segments and minority (test) segments. Slider 740 may be moved left to decrease (reduce or shrink) the size of the training segment size and proportionally increase (enlarge) the size of the test segment size, or instead moved to the right to increase the size of the training segment and proportionally reduce the size of the test segment. As shown in FIG. 7, the training segment size is set to 90%, and the testing segment size is set to 10%, corresponding with 10 training iterations. In various embodiments, the slider may have minimum and maximum limits to how the sizes may be changed, such as the size of the test segment being limited to no greater than 20% and correspondingly, the size of the training segments being limited to no smaller than 80%. The slider 740 may be non-continuous, such that the slider 740 "skips" over disallowed selections, jumping from one allowed selection to another allowed selection (e.g., from 90% to 80% for training segment size, while skipping over values in between 90% and 80%). In various embodiments, additionally or alternatively to enabling selection of segment sizes, graphical user interface 700 may allow for selection of number of iterations (via, e.g., pull-down menu 750), such that a selection of 10 iterations corresponds with segment and testing segment sizes of 90% and 10%, respectively, a selection of 5 iterations corresponds with segment and testing segment sizes of 80% and 20%, respectively, and a selection of 20 iterations corresponds with segment and testing segment sizes of 95% and 5%, respectively. As with FIG. 6, scroll mechanisms (i.e., the bars with triangles at opposing ends) allow for scrolling for viewing of additional elements that may not fit on one screen.

Graphical user interface 700 may also allow for selection of parameters for testing over multiple runs. For example, at 760, graphical user interface 700 may allow for exclusion, from subsequent runs, of objects which have been re-categorized in multiple prior runs. Certain objects (which may be deemed "outlier" or "problematic" objects) may be substantially unlike other objects, or may be, for various reasons, particularly difficult to reliably classify, such that training of models using such outlier objects may skew models and significantly diminish their ability to reliably predict classifications for the larger number of other ("non-outlier") objects. Consequently, such problematic objects may be excluded (through selection of a suitable corresponding parameter) from subsequent runs, and may be flagged (e.g., for special review). In various embodiments, problematic objects may be excluded from a certain number of (earlier) runs, and slated for retesting (through selection of a suitable parameter) in one or more subsequent (later) runs using models that will be trained on "cleaner" and thus more internally consistent data (which may be presumed to be more well-suited to reliably predict outlier or otherwise more problematic objects). In such "delayed" testing of outlier objects, a selectable parameter may be selected to indicate how many runs of testing, cleaning, and retesting, and re-cleaning should be performed before the outlier objects are tested using models trained in later runs.

The "X" at 770 indicates selection to exclude objects which may be deemed problematic. At 780, graphical user interface 700 additionally enables selection of the number of runs (e.g., via drop-down menu 785, which in FIG. 7 shows that three runs has been selected) before an object is excluded. That is, if an object has been recategorized three times (e.g., automatically due to a high-confidence disagreement, or through a between-run selection detected via a graphical user interface) because, for example, it has proved difficult to pin down a suitable classification, the dataset generated for subsequent training-testing runs will exclude the object. At 790, graphical user interface 700 further enables selection of the number of runs (e.g., via drop-down menu 795, which in FIG. 7 shows that four runs has been selected) before an object is reintroduced into datasets for testing. That is, if an object has been excluded for having been recategorized a specified number of times (in FIG. 7, three times), the excluded object will once again be included after a specified number of subsequent runs (in FIG. 7, four runs).

Figures 8, 9:
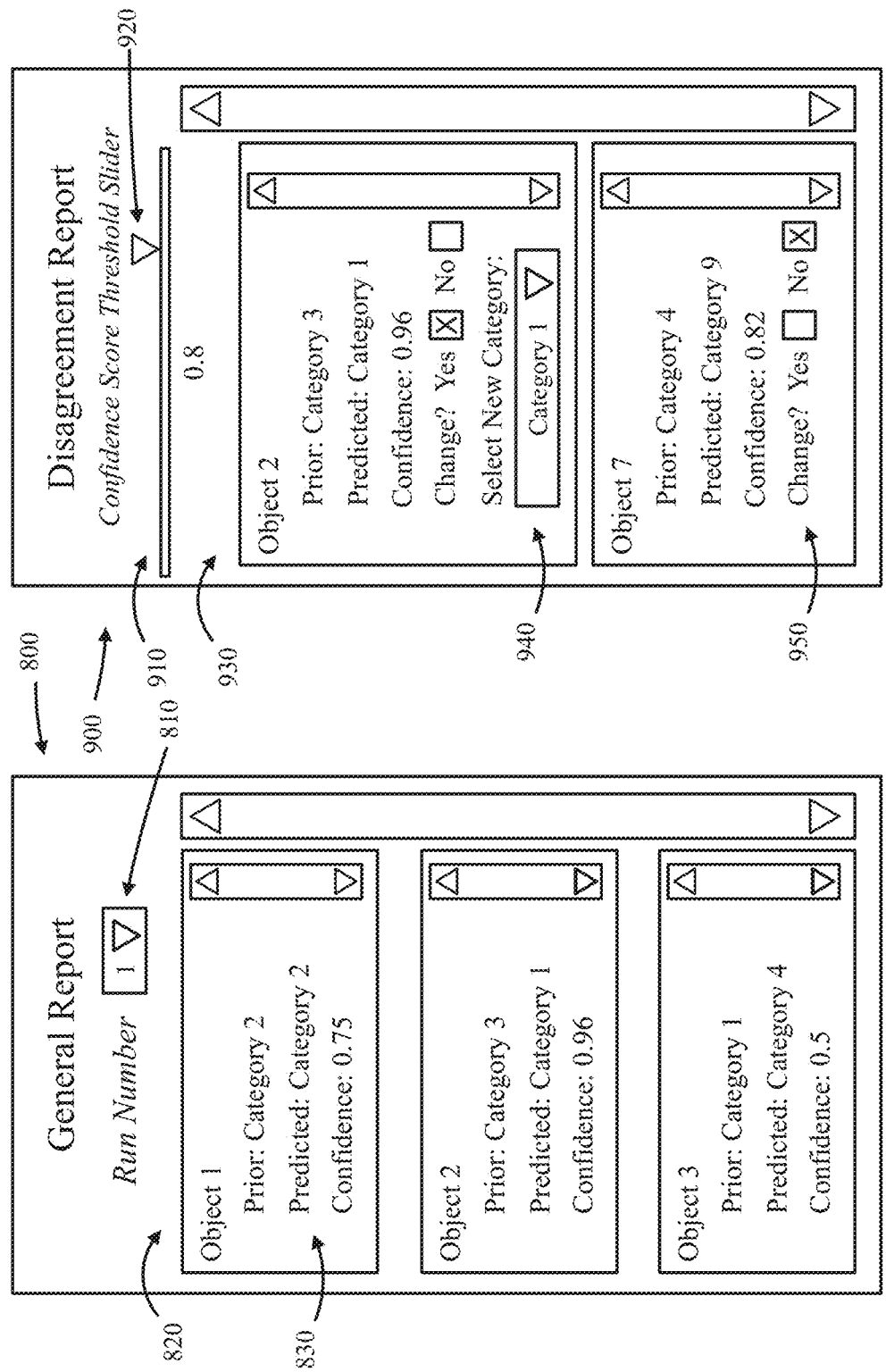
FIG. 8 is an example graphical user interface reporting on data test runs, according to various potential embodiments.
FIG. 9 is an example graphical user interface reporting on any disagreements between prior categorizations and predicted classifications, according to various potential embodiments.

FIG. 8 provides an example graphical user interface 800 with a generated report of a sequence of runs, according to various potential embodiments. The graphical user interface 800 may be presented via, for example, an application 188 accessed via a user device 180 and/or an application 122 accessed via the provider computing system 110. Graphical user interface 800 indicates that the report is for Run Number 1 (selected via drop-down menu 810). Each object has an object region 820 and a corresponding prediction region 830. In FIG. 8, Object 1 was previously classified as "Category 2" and, in Run 1, the predicted category was the same, with a confidence score of 0.75; Object 2 was previously classified as "Category 3" and, in Run 1, the predicted category was "Category 1," with a confidence score of 0.96; and Object 3 was previously classified as "Category 1" and, in Run 1, the predicted category was "Category 4," with a confidence score of 0.5. As with FIGS. 6 and 7, scroll mechanisms (i.e., the bars with triangles at opposing ends) allow for scrolling for viewing of additional elements that may not fit on one screen.

FIG. 9 provides an example graphical user interface 900 with a generated disagreement report, according to various potential embodiments. The graphical user interface 900 may be presented via, for example, an application 188 accessed via a user device 180 and/or an application 122 accessed via the provider computing system 110. Graphical user interface 900 includes a confidence score threshold selector 910, with slider 920, that enables the user to change the threshold (minimum) confidence score deemed sufficiently high to render the corresponding prediction significant. For each object with a disagreement (i.e., a disagreeing prediction with a confidence score above the threshold selected at 920), an object region 930 is provided. For Object 2 in FIG. 9, the prior category was "Category 3" and the predicted category was "Category 1," with a confidence score of 0.96 (which is higher than the selected confidence score threshold of 0.8). Region 930 enables selection to change the classification for Object 2 via, e.g., drop-down

940 that allows for selection of other categories. In some embodiments, the list of available alternatives is not all potential categories but instead a subset of potential categories, such as the categories deemed to be most likely replacements (e.g., the two, three, or four categories predicted to be the most likely categories for having the second, third, and fourth highest confidence scores, respectively, for the corresponding object, or the categories from past runs) In FIG. 9, the category for Object 2 is being changed to Category 1. For Object 7, the prior category was "Category 4," and the predicted category is "Category 9" with a confidence score of 0.82 (which is higher than the selected confidence score of 0.8 but not sufficiently high to be deemed to warrant reclassification). At 950, a selection has been made to leave the prior classification unchanged. As with FIGS. 6 to 8, scroll mechanisms (i.e., the bars with triangles at opposing ends) allow for scrolling for viewing of additional elements that may not fit on one screen.

Figure 10:
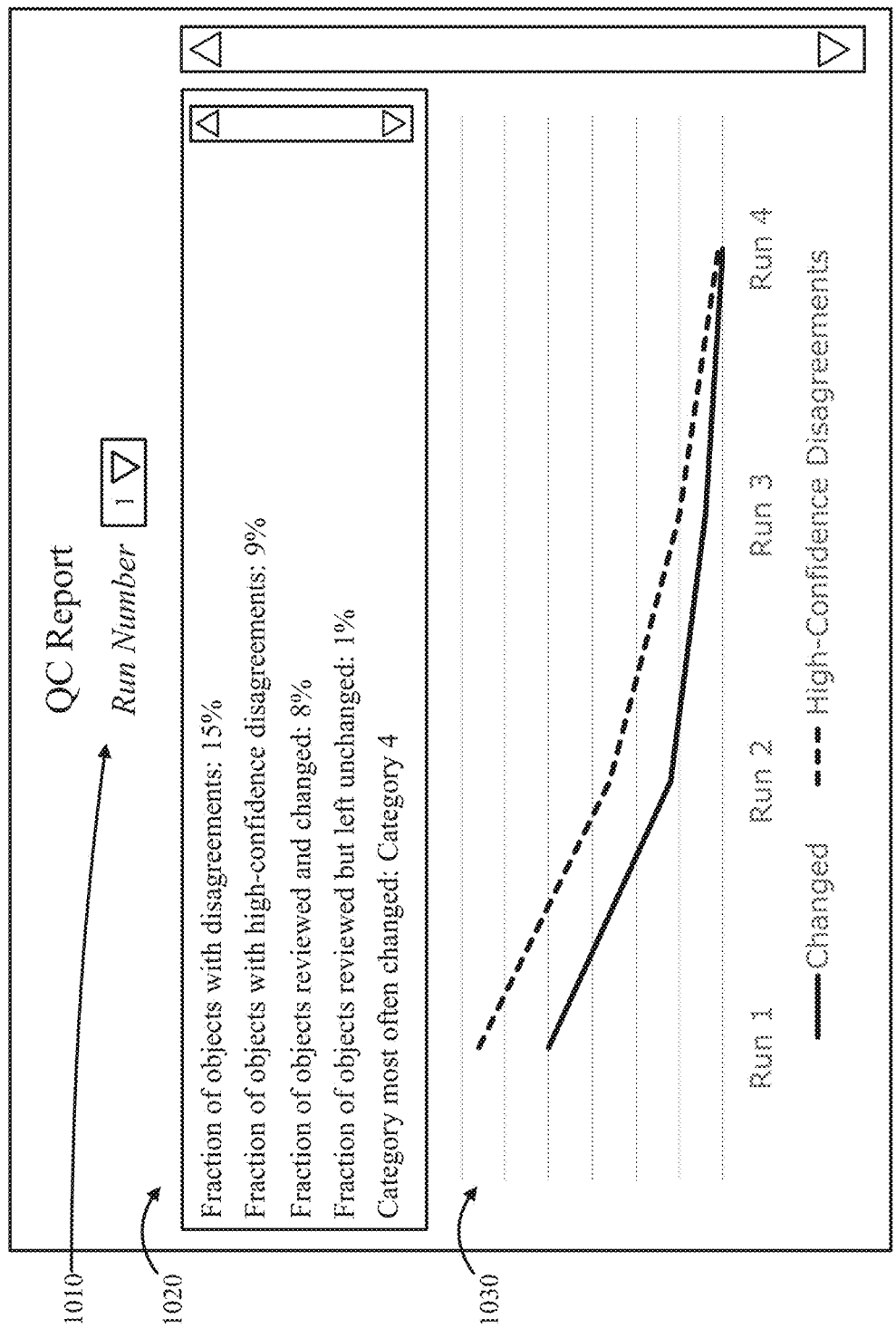
FIG. 10 is an example graphical user interface reporting on results of use of machine learning models in enhancing internal consistency over multiple runs, according to various potential embodiments.

FIG. 10 provides an example graphical user interface 1000 with a generated report corresponding with the apparent changes in internal consistency through multiple runs, according to various potential embodiments. The graphical user interface 1000 may be presented via, for example, an application 188 accessed via a user device 180 and/or an application 122 accessed via the provider computing system 110. Graphical user interface 1000 indicates, at 1010, that Run 1 has been selected for viewing at summary region 1020. In FIG. 10, Run 1 had predicted classifications that differed from prior classifications for 15% of objects (with any confidence score). Because this is the first run, the "prior" classification may be the initial (potentially manually-entered) classification. Run 1 also had 9% of objects having predicted classifications that differed from prior classifications with high confidence (e.g., with confidence scores that exceed the threshold selected at graphical user interface 900). FIG. 10 indicates that, in Run 1, 8% of object classifications were presented via a graphical user interface (such as graphical user interface 900), and 1% of objects were left unchanged (with 7% changed). Interface 1000 also indicates that, for the 7% of objects with changed classifications, Category 4 was most often the classification that was changed to another classification. At 1030, FIG. 10 graphically depicts the progress in enhancing internal consistency through multiple runs with data that tends to be cleaner in subsequent runs. The dotted line corresponds with high-confidence disagreements, and the solid line corresponds with the fraction of objects with disagreements for which objects were reclassified. As depicted, the number of high-confidence disagreements (which is positively correlated with internal inconsistency in the data) decreases in subsequent runs, as does the number of classification changes, indicating that the internal consistency appears to be increasing. As with FIGS. 6 to 9, scroll mechanisms (i.e., the bars with triangles at opposing ends) allow for scrolling for viewing of additional elements that may not fit on one screen.

It is noted that any element in interfaces 600, 700, 800, 900, and 1000 may be selectable to allow the user to obtain more details, in a pop-up window, in another screen, or otherwise. For example, the user may select an object, a selectable category, a tool, a confidence score, a prior or predicted category, a run, etc., for more or related information. Any combination of selection mechanisms or selectors may be employed in any of the graphical user interfaces, such as different combinations of radio buttons or other virtual buttons, fields enabling free-text entry, drop-down menus, sliders, or any other graphical control elements deemed suitable.

Various embodiments of the disclosure relate to a machine learning method. The method may be implemented using one or more computing devices of a machine learning platform. The method may comprise generating, for objects in a dataset comprising a set of prelabeled objects, machine-predicted labels. The machine-predicted labels may be generated by (i) training a machine learning model on a majority of the dataset and (ii) applying the trained machine learning model to the remainder of the dataset. Generation of machine-predicted labels may yield machine-predicted labels and corresponding confidence scores. The method may comprise repeating (i) and (ii) until every object in the set of objects has a prelabel, a machine-predicted label, and a confidence score corresponding to the machine-predicted label. The method may comprise comparing the machine-predicted label with the corresponding prelabel. Machine-predicted labels may be compared with corresponding prelabels for each machine-predicted label with a corresponding confidence score that is greater than a threshold. The comparison may generate a subset of objects that have machine-predicted labels in disagreement from corresponding prelabels. The method may comprise presenting a graphical user interface comprising the subset of objects. The graphical user interface may comprise, for each object in the subset, a user field. The user field may be configured to trigger, in response to a detected input therein, relabeling of the object. The method may comprise detecting, via the graphical user interface, one or more relabels for one or more objects in the subset. The method may comprise transmitting to a user device a report. The report may comprise the set of objects in the dataset. The report may comprise, for each object, at least one of the prelabel or the relabel.

In various embodiments, model-training iterations may be independent such that the machine learning model trained in a second iteration is not further training the machine learning model of a first iteration. The machine learning model may be trained via supervised learning. The method may comprise ten model-training iterations. In each iteration, the machine learning model may be trained on about 90% of the dataset and the trained machine learning model may be used to test the remaining about 10% of the dataset.

In various embodiments, the method may comprise generating a second dataset comprising the set of objects. The second dataset may comprise, for each object, either the corresponding prelabel or the corresponding relabel. The method may comprise generating, for objects in the second dataset, second machine-predicted labels. The second machine-predicted labels may be generated by (i) training a second machine learning model on a majority of the second dataset and (ii) applying the second trained machine learning model to the remainder of the second dataset. The second machine learning model may be trained via supervised learning. The second trained machine learning model may be applied to the remainder of the second dataset to obtain second machine-predicted labels and corresponding second confidence scores. Steps (i) and (ii) may be repeated until every object in the set of objects has a second machine-predicted label and a second confidence score corresponding to the second machine-predicted label. Each object in the set of objects may also be associated with a prior label that is either the corresponding prelabel or the corresponding relabel.

In various embodiments, the method may comprise comparing the second machine-predicted label with the corresponding prior label. The second machine-predicted label may be compared with the corresponding label for each second machine-predicted label with a corresponding second confidence score that is greater than a second threshold. The second machine-predicted label may be compared with the corresponding label to generate a second subset of objects that have machine-predicted labels in disagreement from corresponding prior labels. The method may comprise presenting a second graphical user interface comprising the second subset of objects. The graphical user interface may comprise a second user field configured to trigger, in response to a detected input therein, relabeling of the object. The graphical user interface may comprise the second user field for each object in the second subset. The method may comprise detecting, via the second graphical user interface, one or more relabels for one or more objects in the subset.

In various embodiments, the method may comprise prelabeling each object in the set of objects. Objects may be prelabeled before generating machine-predicted labels. Manually prelabeling each object in the set of objects may comprise presenting a second graphical user interface with selectable fields and detecting, via the selectable fields, prelabel selections for each object in the set of objects.

In various embodiments, the majority of the dataset may comprise at least about 80% of the dataset as training data and the remainder as test data. The test data of the iterations may be substantially non-overlapping. The majority of the dataset may comprise about 90% of the dataset and the remainder may comprise about 10% of the dataset. A number of potential labels may be no greater than 1% of a number of objects in the set of objects. The number of potential labels may be no greater than 0.1% of the number of objects in the set of objects. The number of potential labels may be no greater than 0.01% of the number of objects in the set of objects.

In various embodiments, training the machine learning model may comprise using random forest modeling, extreme random forest modeling, and/or gradient boosting. The method may comprise lemmatizing text in manual categorizations of the objects to generate the prelabels. The method may comprise removing stop words and white space from the manual categorizations to generate the prelabels. The method may comprise generating n-grams for text in manual categorizations by parsing the text to generate the prelabels. The method may comprise one-hot encoding the n-grams to obtain a 1 when the n-gram is present in a text field and a 0 when the n-gram is not present in the text field. The method may comprise feeding a resulting set of 1s and 0s to the machine learning models.

Various embodiments of the disclosure relate to a machine learning method implemented using one or more computing devices of a machine learning platform. The method may comprise generating, for objects in a dataset comprising a set of prelabeled objects, machine-predicted labels. The machine-predicted labels may be generated by (i) training, via supervised learning, a machine learning model on a majority segment of the dataset and (ii) applying the trained machine learning model to a minority segment of the dataset to obtain machine-predicted labels. The method may comprise iteratively repeating (i) and (ii) until every object in the set of objects has a prelabel and a machine-predicted label. In each iteration, the majority segment may comprise from about 80% of the dataset to about 95% of the segment, and the minority segment may comprise the remaining about 5% to about 20% of the dataset. The method may comprise modifying prelabels in the dataset in response to finding differences between the prelabels and corresponding machine-predicted labels for a subset of objects in the dataset.

In various embodiments, applying the trained machine learning models may yield a confidence score for each machine-predicted label. Modifying prelabels in the dataset may comprise modifying prelabels for objects in the subset of objects only when an object's machine-predicted label has a corresponding confidence score exceeding a threshold. Modifying prelabels may comprise presenting a graphical user interface comprising the subset of objects and, for each object in the subset, a user field configured to trigger, in response to a detected input therein, relabeling of the object. Modifying prelabels may comprise detecting, via the graphical user interface, one or more relabels for one or more objects in the subset.

In various embodiments, the method may comprise generating a second dataset comprising the set of objects and, for each object, either the corresponding prelabel or the corresponding relabel. The method may comprise generating, for objects in the second dataset, second machine-predicted labels by (i) training, via supervised learning, a second machine learning model on a majority of the second dataset and (ii) applying the second trained machine learning model to the remainder of the second dataset to obtain second machine-predicted labels and corresponding second confidence scores. The method may comprise repeating (i) and (ii) until every object in the set of objects has (1) a second machine-predicted label and (2) and a second confidence score corresponding to the second machine-predicted label.

In various embodiments, the method may comprise lemmatizing text in manual categorizations of the objects to generate the prelabels. The method method may comprise generating n-grams for text in manual categorizations. N-grams may generated by parsing the text to generate the prelabels. The method may comprise one-hot encoding the n-grams to obtain a 1 when the n-gram is present in a text field and a 0 when the n-gram is not present in the text field. The method may comprise feeding a resulting set of 1s and 0s to the machine learning models in training the machine learning models.

Various embodiments of the disclosure relate to a machine learning platform. The machine learning platform may comprise a computing device having a processor and a memory with instructions executable by the processor to cause the computing device to perform specific functions. The machine learning platform may be configured to generate, for objects in a dataset comprising a set of prelabeled objects, machine-predicted labels. The machine-predicted labels may be generated by (i) training, via supervised learning, a machine learning model on a majority of the dataset and (ii) applying the trained machine learning model to the remainder of the dataset to obtain machine-predicted labels and corresponding confidence scores. The machine learning platform may be configured to repeat (i) and (ii) until every object in the set of objects has a prelabel, a machine-predicted label, and a confidence score corresponding to the machine-predicted label. For each machine-predicted label with a corresponding confidence score that is greater than a threshold, the machine learning platform may be configured to compare the machine-predicted label with the corresponding prelabel to generate a subset of objects that have machine-predicted labels in disagreement from corresponding prelabels. The machine learning platform may be configured to present a graphical user interface comprising the subset of objects and, for each object in the subset, a user field. The user field may be configured to trigger, in response to a detected input therein, relabeling of the object. The machine learning platform may be configured to detect, via the graphical user interface, one or more relabels for one or more objects in the subset. The machine learning platform may be configured to transmit to a user device a report comprising the set of objects in the dataset and, for each object, at least one of the prelabel or the relabel.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

It is noted that terms such as "approximately," "substantially," "about," or the like may be construed, in various embodiments, to allow for insubstantial or otherwise acceptable deviations from specific values. In various embodiments, deviations of 20 percent may be considered insubstantial deviations, while in certain embodiments, deviations of 15 percent may be considered insubstantial deviations, and in other embodiments, deviations of 10 percent may be considered insubstantial deviations, and in some embodiments, deviations of 5 percent may be considered insubstantial deviations. In various embodiments, deviations may be acceptable when they achieve the intended results or advantages, or are otherwise consistent with the spirit or nature of the embodiments.

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A machine learning method implemented using one or more computing devices of a machine learning platform, the method comprising:

generating, for objects in a dataset comprising a set of prelabeled objects, machine-predicted labels by (i) training, via supervised learning, a machine learning model on a majority of the dataset and (ii) applying the trained machine learning model to the remainder of the dataset to obtain machine-predicted labels and corresponding confidence scores, wherein (i) and (ii) are iteratively repeated until every object in the set of objects has a prelabel, a machine-predicted label, and a confidence score corresponding to the machine-predicted label;

for each machine-predicted label with a corresponding confidence score that is greater than a threshold, comparing the machine-predicted label with the corresponding prelabel to generate a subset of objects that have machine-predicted labels in disagreement from corresponding prelabels;

presenting a graphical user interface comprising the subset of objects and, for each object in the subset, a user field configured to trigger, in response to a detected input therein, relabeling of the object; detecting, via the graphical user interface, one or more relabels for one or more objects in the subset;

transmitting to a user device a report comprising the set of objects in the dataset and, for each object, at least one of the prelabel or the relabel;

determining that a first object of the one or more objects has been relabeled greater than a threshold number of times; and excluding the first object from the dataset responsive to determining that the first object has been relabeled greater than the threshold number of times.

2. The machine learning method of claim 1, wherein model-training iterations are independent such that the machine learning model trained in a second iteration is not further training the machine learning model of a first iteration.

3. The machine learning method of claim 1, wherein the method comprises ten model-training iterations, with each iteration training the machine learning model on about 90% of the dataset and using the trained machine learning model to test the remaining about 10% of the dataset.

4. The machine learning method of claim 1, wherein the majority of the dataset comprises at least 80% of the dataset as training data and the remainder as test data, wherein the test data of the iterations are substantially non-overlapping.

5. The machine learning method of claim 1, further comprising:
generating a second dataset comprising the set of objects and, for each object, either the corresponding prelabel or the corresponding relabel; and
generating, for objects in the second dataset, second machine-predicted labels by (i) training, via supervised learning, a second machine learning model on a majority of the second dataset and (ii) applying the second trained machine learning model to the remainder of the second dataset to obtain second machine-predicted labels and corresponding second confidence scores, wherein (i) and (ii) are repeated until every object in the set of objects has (1) a second machine-predicted label and (2) and a second confidence score corresponding to the second machine-predicted label.

6. The machine learning model of claim 5, further comprising, for each second machine-predicted label with a corresponding second confidence score that is greater than a second threshold, comparing the second machine-predicted label with the corresponding prior label to generate a second subset of objects that have machine-predicted labels in disagreement from corresponding prior labels;
presenting a second graphical user interface comprising the second subset of objects and, for each object in the second subset, a second user field configured to trigger, in response to a detected input therein, relabeling of the object; and
detecting, via the second graphical user interface, one or more relabels for one or more objects in the subset.

7. The machine learning method of claim 1, further comprising, before generating machine-predicted labels, manually prelabeling each object in the set of objects by presenting a second graphical user interface with selectable fields, and detecting, via the selectable fields, prelabel selections for each object in the set of objects.

8. The machine learning method of claim 1, wherein a number of potential labels is no greater than 1% of a number of objects in the set of objects.

9. The machine learning method of claim 1, wherein training the machine learning model comprises using random forest modeling.

10. The machine learning method of claim 1, wherein training the machine learning model comprises using gradient boosting.

11. The machine learning method of claim 1, further comprising lemmatizing text in manual categorizations of the objects to generate the prelabels.

12. The machine learning method of claim 1, further comprising removing stop words and white space from the manual categorizations to generate the prelabels.

13. The machine learning method of claim 1, further comprising generating n-grams for text in manual categorizations by parsing the text to generate the prelabels.

14. The machine learning method of claim 13, further comprising one-hot encoding the n-grams to obtain a 1 when the n-gram is present in a text field and a 0 when the n-gram is not present in the text field, and feeding a resulting set of 1s and 0s to the machine learning models.

15. A machine learning method implemented using one or more computing devices of a machine learning platform, the method comprising:
generating, for objects in a dataset comprising a set of prelabeled objects, machine-predicted labels by (i) training, via supervised learning, a machine learning model on a majority segment of the dataset and (ii) applying the trained machine learning model to a minority segment of the dataset to obtain machine-predicted labels, wherein (i) and (ii) are repeated iteratively until every object in the set of objects has a prelabel and a machine-predicted label, and wherein in each iteration, the majority segment comprises from about 80% of the dataset to about 95% of the segment, and the minority segment comprises the remaining about 5% to about 20% of the dataset;
modifying prelabels in the dataset in response to fin ding differences between the prelabels and corresponding machine-predicted labels for a subset of objects in the dataset;
determining that the machine-predicted label of a first object of the set of prelabeled objects does not match the prelabel of the first object; and
excluding the first object from the dataset responsive to determining that the machine-predicted label of the first object does not match the prelabel of the first object;
wherein applying the trained machine learning models yields a confidence score for each machine-predicted label, and wherein modifying prelabels in the dataset comprises modifying prelabels for objects in the subset of objects only when an object's machine-predicted label has a corresponding confidence score exceeding a threshold.

16. The machine learning method of claim 15, wherein modifying prelabels comprises:
presenting a graphical user interface comprising the subset of objects and, for each object in the subset, a user field configured to trigger, in response to a detected input therein, relabeling of the object; and
detecting, via the graphical user interface, one or more relabels for one or more objects in the subset.

17. The machine learning method of claim 16, further comprising:
generating a second dataset comprising the set of objects and, for each object, either the corresponding prelabel or the corresponding relabel; and
generating, for objects in the second dataset, second machine-predicted labels by (i) training, via supervised learning, a second machine learning model on a majority of the second dataset and (ii) applying the second trained machine learning model to the remainder of the second dataset to obtain second machine-predicted labels and corresponding second confidence scores, wherein (i) and (ii) are repeated until every object in the set of objects has (1) a second machine-predicted label and (2) and a second confidence score corresponding to the second machine-predicted label.

18. The machine learning method of claim 15, further comprising lemmatizing text in manual categorizations of the objects to generate the prelabels, generating n-grams for text in manual categorizations by parsing the text to generate the prelabels, one-hot encoding the n-grams to obtain a 1 when the n-gram is present in a text field and a 0 when the n-gram is not present in the text field, and feeding a resulting set of 1s and 0s to the machine learning models in training the machine learning models.

19. A machine learning platform comprising a computing device having a processor and a memory with instructions executable by the processor to cause the computing device to:
  generate, for objects in a dataset comprising a set of prelabeled objects, machine-predicted labels by (i) training, via supervised learning, a machine learning model on a majority of the dataset and (ii) applying the trained machine learning model to the remainder of the dataset to obtain machine-predicted labels and corresponding confidence scores, wherein (i) and (ii) are repeated until every object in the set of objects has a prelabel, a machine-predicted label, and a confidence score corresponding to the machine-predicted label;
  for each machine-predicted label with a corresponding confidence score that is greater than a threshold, compare the machine-predicted label with the corresponding prelabel to generate a subset of objects that have machine-predicted labels in disagreement from corresponding prelabels;
  present a graphical user interface comprising the subset of objects and, for each object in the subset, a user field configured to trigger, in response to a detected input therein, relabeling of the object; detect, via the graphical user interface, one or more relabels for one or more objects in the subset;
  transmit to a user device a report comprising the set of objects in the dataset and, for each object, at least one of the prelabel or the relabel;
  determine that a first object of the one or more objects has been relabeled greater than a threshold number of times; and
  exclude the first object from the dataset responsive to determining that the first object has been relabeled greater than the threshold number of times.

* * * * *